(12) United States Patent
Zaghib et al.

(10) Patent No.: US 10,050,270 B2
(45) Date of Patent: Aug. 14, 2018

(54) LITHIUM-ION SECONDARY BATTERY AND METHOD OF PRODUCING SAME

(71) Applicant: HYDRO-QUÉBEC, Montréal (CA)

(72) Inventors: Karim Zaghib, Longueil (CA); Shinji Saito, Tsu (JP); Abdelbast Guerfi, Brossard (CA); Takehiko Sawai, Tsu (JP); Kazunori Urao, Tsu (JP); Jun Nakagawa, Tsu (JP); Francis Barray, Saint-Hyacinthe (CA); Joël Fréchette, Boucherville (CA)

(73) Assignee: HYDRO-QUEBEC, Montreal (CA)

( * ) Notice: Subject to any disclaimer, the term of this patent is extended or adjusted under 35 U.S.C. 154(b) by 325 days.

(21) Appl. No.: 14/399,894

(22) PCT Filed: May 6, 2013

(86) PCT No.: PCT/CA2013/050347
§ 371 (c)(1),
(2) Date: Nov. 7, 2014

(87) PCT Pub. No.: WO2013/166598
PCT Pub. Date: Nov. 14, 2013

(65) Prior Publication Data
US 2015/0162610 A1    Jun. 11, 2015

(30) Foreign Application Priority Data
May 8, 2012    (CA) ...................... 2776205

(51) Int. Cl.
*H01M 4/58* (2010.01)
*H01M 4/62* (2006.01)
(Continued)

(52) U.S. Cl.
CPC ......... *H01M 4/5825* (2013.01); *H01M 4/133* (2013.01); *H01M 4/1393* (2013.01);
(Continued)

(58) Field of Classification Search
CPC .... H01M 4/133; H01M 4/1393; H01M 4/043; H01M 4/0471; H01M 4/587;
(Continued)

(56) References Cited

U.S. PATENT DOCUMENTS 5,631,100 A    5/1997  Yoshino et al.
5,910,283 A    6/1999  Goodenough et al.
(Continued)

FOREIGN PATENT DOCUMENTS

CA    2684869        11/2008
CA    2786012 A1     10/2012
(Continued)

OTHER PUBLICATIONS

Office Action (Notice of Reasons for Refusal) dated Oct. 17, 2016, by the Japanese Patent Office in corresponding Japanese Patent Application No. P2015-510589, and an English Translation of the Office Action. (10 pages).
(Continued)

*Primary Examiner* — Osei K Amponsah
(74) *Attorney, Agent, or Firm* — Buchanan Ingersoll & Rooney P.C.

(57) ABSTRACT

A lithium-ion secondary battery including positive and negative electrodes, a separator element, an electrical conductor element and a binder, wherein the positive electrode includes a lithium-containing metal phosphate compound coated with a carbon material having at least one phase selected from a graphene phase and an amorphous phase, and further includes carbon black and a fibrous carbon material and wherein the negative-electrode material includes a graphite carbon material having at least one carbon phase selected from a graphene phase and an amorphous phase, and further includes carbon black and a fibrous carbon material, and wherein the binder includes a water-
(Continued)

soluble synthetic resin or a water-dispersible synthetic resin. The most preferred positive electrode includes LiFePO$_4$. The most preferred negative electrode includes artificial graphite or graphitazable powder. The most preferred binder is carboxyl methyl cellulose further including a surface active agent. A method of making the lithium-ion secondary battery.

27 Claims, 4 Drawing Sheets

(51) Int. Cl.
H01M 4/587 (2010.01)
H01M 4/36 (2006.01)
H01M 10/0525 (2010.01)
H01M 4/133 (2010.01)
H01M 4/1393 (2010.01)
H01M 4/04 (2006.01)

(52) U.S. Cl.
CPC .......... *H01M 4/364* (2013.01); *H01M 4/366* (2013.01); *H01M 4/587* (2013.01); *H01M 4/622* (2013.01); *H01M 4/625* (2013.01); *H01M 10/0525* (2013.01); *H01M 4/043* (2013.01); *H01M 4/0471* (2013.01); *H01M 4/621* (2013.01); *Y02T 10/7011* (2013.01)

(58) Field of Classification Search
CPC ...... H01M 4/621; H01M 4/625; H01M 4/364; H01M 4/366; H01M 4/5825; H01M 4/622
USPC .............................................. 429/221–231.8
See application file for complete search history.

(56) References Cited

U.S. PATENT DOCUMENTS

| | | | |
|---|---|---|---|
| 6,855,273 B2 | 2/2005 | Ravet et al. | |
| 8,597,835 B2 | 12/2013 | Kawasaki et al. | |
| 2010/0119949 A1 | 5/2010 | Yano et al. | |
| 2012/0064408 A1* | 3/2012 | Song | H01M 4/366 429/220 |
| 2012/0171566 A1* | 7/2012 | Yoshitake | B82Y 30/00 429/209 |
| 2012/0231337 A1 | 9/2012 | Miyata et al. | |
| 2012/0328923 A1 | 12/2012 | Sawai et al. | |
| 2014/0023926 A1* | 1/2014 | Li | H01M 4/133 429/213 |

FOREIGN PATENT DOCUMENTS

| | | | |
|---|---|---|---|
| CA | 2754372 A1 | 4/2013 | |
| JP | 5-226004 A | 9/1993 | |
| JP | 9-134724 A | 5/1997 | |
| JP | 2000-123860 A | 4/2000 | |
| JP | 2000-509193 A | 7/2000 | |
| JP | 2001-126733 A | 5/2001 | |
| JP | 2003-168429 A | 6/2003 | |
| JP | 2005-019399 A | 2/2005 | |
| JP | 2006-302671 | * 11/2006 | .............. H01M 4/58 4/2 |
| JP | 2009-043514 A | 2/2009 | |
| JP | 2010027458 A | 2/2010 | |
| JP | 2010-238575 A | 10/2010 | |
| JP | 2011-108522 A | 6/2011 | |
| JP | 2011-181463 A | 9/2011 | |
| JP | 2012178327 A | 9/2012 | |
| WO | 01/62019 A2 | 8/2001 | |
| WO | 2004/091017 A1 | 10/2004 | |
| WO | WO 2010/113884 A1 | 10/2010 | |
| WO | 2011062232 A1 | 5/2011 | |

OTHER PUBLICATIONS

European Search Report issued in co-pending application No. 13786997.0, dated Dec. 23, 2015, 8 pages.
Porcher W. et al, "Optimizing the surfactant for the aqueous processing of LiFeP04 composite electrodes", Journal of Power Sources, Elsevier SA, CH, vol. 195, No. 9, May 1, 2010, p. 2835-2843.
Yingke, Zhou et al, A porous LiFeP04 and carbon nanotube composite, Chemical Communications—Chemcom, vol. 46, No. 38, Jan. 1, 2010, p. 7151-7153.
International Search Report (PCT/ISA/210) dated Jul. 30, 2013, by the Canadian Intellectual Property Office as the International Searching Authority for International Application No. PCT/CA2013/050347.
Written Opinion (PCT/ISA/237) dated Jul. 30, 2013, by the Canadian Intellectual Property Office as the International Searching Authority for International Application No. PCT/CA2013/050347.
Office Action (Notice of Reasons for Rejection) dated Mar. 20, 2018, by the Japanese Patent Office in Japanese Patent Application No. 2015-510589, and an English Translation of the Office Action. (3 pages).
Office Action (Notification of Reasons for Refusal) dated Mar. 16, 2018, by the Japanese Patent Office in Japanese Patent Application No. 2017-081333, and an English Translation of the Office Action. (6 pages).

* cited by examiner

LITHIUM-ION SECONDARY BATTERY AND METHOD OF PRODUCING SAME

TECHNICAL FIELD

The present invention relates to a lithium-ion secondary battery and a method of producing the same, especially, to positive and negative electrodes for a lithium-ion secondary battery and a method of producing the same.

BACKGROUND ART

It is known to provide a lithium-ion secondary battery with a negative electrode formed by using a material other than metallic lithium and capable of absorbing and discharging lithium ions thereby restraining deposit of dendrite in comparison to a negative electrode made of metallic lithium. Such known battery helps to prevent the occurrence of a short circuit between positive and negative electrodes and thus improves safety. In addition, such batteries have reasonably good capacity and energy density.

Nevertheless, there is an ongoing demand for such type of Lithium-ion secondary batteries to have yet higher capacities, energy densities and long battery life. This is particularly apparent in the automotive and portable electronic devices. Such batteries must sustain repeated charging and discharging at a high electric current for up to tens of thousands of cycles without noticeable loss of capacity.

In general, higher capacity is obtained by decreasing the electric resistance within the battery.

It has already been suggested to comply with these demands by: (a) having a positive-electrode material made of a lithium metal oxide and a negative electrode material made of carbon (see patent documents 2, 3 and 4), (b) increasing the specific surface areas of particles of a reactive substances of the battery by decreasing the diameters of the particles or increasing the surface area of the electrode, (c) by decreasing liquid diffusion resistance by thinning the separator membranes.

Of course, when the diameter of the particles of reactive material of the battery are made smaller, the specific surface areas of the particles increase. This in turn necessitates the amount of a binder to be increased. As a result, it is difficult to provide a high capacity battery when more binder is present. In addition, the positive-electrode and negative-electrode materials may peel or drop from a metal foil used as an electricity collector, which may result in the occurrence of an internal short circuit inside the battery or some decrease in the output voltage of the battery and thermal runaway. Thus, the capacity and safety of the lithium secondary battery are impaired.

To increase the adherence of the metal foil to the positive-electrode and negative-electrode materials, methods of altering the binder substance are known (patent document 1).

Nevertheless, when the battery is cyclically charged and discharged at a high electric current, the positive-electrode and negative-electrode materials expand and contract. Thus conductive paths of particles between the positive and negative electrodes are impaired. As a result, soon after the initial charging and discharging cycles, the battery loses capacity and has a short life.

Recently, a lithium-containing metal phosphate compound such as an olivine-type lithium iron phosphate has attracted rising attention as active substance of the positive electrode for the lithium-ion secondary battery (patent documents 5, 6). Although cheap to purchase, the active substance suffers from high electric resistance and thus reduced capacity.

PRIOR ART PATENT DOCUMENTS

Patent document 1: Japanese Patent Application Laid-Open No. 5-226004
Patent document 2: Japanese Patent Application Laid-Open No. 2005-19399
Patent document 3: Japanese Patent Application Laid-Open No. 2001-126733
Patent document 4: Japanese Patent Application Laid-Open No. 2003-168429
Patent document 5: Japanese Patent Application Laid-Open No. 2000-509193
Patent document 6: Japanese Patent Application Laid-Open No. 9-134724

SUMMARY OF THE INVENTION

The present invention generally seeks to decrease the resistance of a positive electrode containing a lithium-containing metal phosphate compound and that of a negative electrode which is the anti pole thereof.

The present invention provides for a lithium-ion secondary battery which is inexpensive and is capable of maintaining the life performance of repeated charging and discharging cycles at a high electric current. Also, the present invention provides for a method of producing such lithium-ion secondary battery.

The lithium-ion secondary battery of the present invention has a group of electrode plates formed by layering a negative electrode plate and a positive electrode plate one upon another or by winding the negative electrode plate and the positive electrode plate with in both cases, a separator and an electrolyte in which the group of the electrodes are immersed.

The group of the electrodes of the lithium-ion secondary battery is constructed of a positive-electrode material, a negative-electrode material, and binders added to the positive-electrode material and the negative-electrode material respectively to form plates.

According to aspects of the invention, there is provided:

A lithium-ion secondary battery comprising positive and negative electrodes, a separator element, an electrical conductor element and a binder, wherein the positive electrode comprises a lithium-containing metal phosphate compound coated with a carbon material having at least one phase selected from a graphene phase and an amorphous phase, and further comprises carbon black and a fibrous carbon material and wherein the negative-electrode material comprises a graphite carbon material having at east one carbon phase selected from a graphene phase and an amorphous phase, and further comprises carbon black and a fibrous carbon material and wherein the binder comprises a water-soluble synthetic resin or a water-dispersible synthetic resin.

Preferably, the lithium-containing metal phosphate compound is $LiFePO_4$, $LiCoPO_4$, or $LiMnPO_4$, most preferably $LiFePO_4$.

Preferably, the graphite carbon is artificial, graphite or graphitazable powder.

Preferably, the carbon black is a conductive carbon black selected from acetylene black and Ketjen black.

Preferably, the fibrous carbon material is a carbon nanotube, a carbon nanofiber or a mixture thereof and can be a mixture of at least two types of fibrous carbon materials different in fiber diameter and/or fiber length. Most preferably, carbon fibrous materials being a combination of (a) small fiber diameter, such as about 5 to 15 nm, preferably about 10 nm and small length, such as about 1 to 3 µm, preferably 3 µm and (b) a large fiber diameter, such as about 70 to 150 nm, preferably about 100 nm, and a long fiber length such as about 5 to 10 µm, preferably about 5 µm. Preferably, the fibrous carbon materials will be mainly present on the surface of the lithium-containing metal phosphate particles, and the fibrous carbon material having a large fiber diameter and a long fiber length will be mainly present between the lithium-containing metal phosphate particles.

Preferably, the water-soluble synthetic resin or a water-dispersible synthetic resin is polyacrylic acid, styrene-butadiene rubber, polyvinyl alcohol, polyvinyl acetate, polyethylene oxide, polyvinyl pyrrolidone, or polyacrylamide and may further comprise a binder further comprises a binder dispersant, such as carboxyl methyl cellulose. The binder may advantageously comprise a surface active agent, for example, a polar solvent such as N-methyl-2-pyrrolidone, dimethylformamide, dimethylacetamide, or dimethyl sulfoxide or a fatty acid such as oleic acid or lithium oleate, a fatty acid ester, a fatty alcohol, ester, an alkoxylated alcohol, an alkoxylated amine, a fatty alcohol sulfate, a phosphate ester, an imidazolium or quaternary ammonium salt, ethylene oxide/propelene oxide, a Tween® surfactants produced by Uniquema such as Tween® 80 and 81 (polyoxyethylene-sorbitan monooleate, an anionic or nonionic surfactant such as a sulfosuccinate (Triton-GR series), a sulfate and a suifonate (Triton XN) and ocytylphenol ethoxylate (Triton-X), a low foam surfactant such as Triton-DF, CF series, alcohol ethoxylates (Tergitol-TMN and S series), nonylphenol ethoxylates (Tergitol NP series) and an alkyl diphenyl oxide disulfonate (Dowfax series). Most preferably, the surface active agent will be N-methyl-2-pyrrolidone or Triton™. Also most preferably, the amount of the surface active agent is about 0.5 to 5 mass % of an amount of the binder.

Preferably, the thickness of the coating layer is about 1 to 10 nm, most preferably about 2 to 5 nm.

Preferably, in the positive electrode, the ratio of a total content of the carbon black and the fibrous carbon material to a total content of the coated lithium-containing metal phosphate compound will not be less than about 2 mass %, preferably about 2 to 10 mass %.

Still preferably, in the negative electrode, the ratio of a total content of the carbon black and the fibrous carbon material to a total content of the coated graphite carbon material will not be less than about 2 mass %, preferably about 2 to 10 mass %.

Preferably, in the lithium-ion secondary battery of the present invention, electronic conduction occurs between a surface the graphene phase or the amorphous phase, a surface of the carbon black and a surface of the fibrous carbon material, due to compositeness resulting from bonds between carbon atoms.

According to other aspects of the invention, there is provided a method of producing a lithium-ion secondary battery as defined above comprising: (a) mixing, by using a compression shear impact-type particle-compositing method, respectively, the coated lithium-containing metal phosphate compound with the carbon black, and the coated graphite carbon material with the carbon black; (b) mixing a mixture obtained in step (a) with the fibrous carbon material dispersed in water; and (c) mixing a mixture obtained in step (b) with a water solution in which the water-soluble resin is dissolved or with a water solution in which the water-dispersible resin is dispersed. Preferably, the method further comprises calcining under inert atmosphere the mixture obtained in step (b), most preferably at a temperature of about 700 to 850° C., for a period of about 0.5 to 2 hours. Preferably, in step (c), a binder dispersant, such as carboxyl methyl cellulose, is added to the water-soluble resin or the water-dispersible resin prior to mixing with a mixture obtained in step (b). Most preferably, in step (c), a surface active agent, such as N-methyl-2-pyrrolidone or Triton™ is added to the water-soluble resin or the water-dispersible resin prior to mixing with a mixture obtained in step (b) at a preferred ratio of about 0.5 to 5 mass % of the amount of the water-soluble resin or the water-dispersible resin.

DETAILED DESCRIPTION OF PREFERRED EMBODIMENTS

A lithium-ion secondary battery is a secondary battery in which electrode group is stacked or wound by interposing in both cases a separator between a positive-electrode plate and a negative-electrode plate. The electrolyte is immersed or penetrated in the electrodes, thereby permitting the repeated absorption and release of lithium ions from one type of electrode to the other.

A positive-electrode material for the lithium-ion secondary battery is formed on the surface of the positive-electrode plate, whereas a negative-electrode material for the lithium-ion secondary battery is formed on the surface of the negative-electrode plate.

The positive-electrode material for the lithium-ion secondary battery contains a lithium-containing metal phosphate compound coated with a carbon material having a graphene phase or amorphous carbon phase on its surface and further containing carbon black and a fibrous carbon material.

Figure 1:
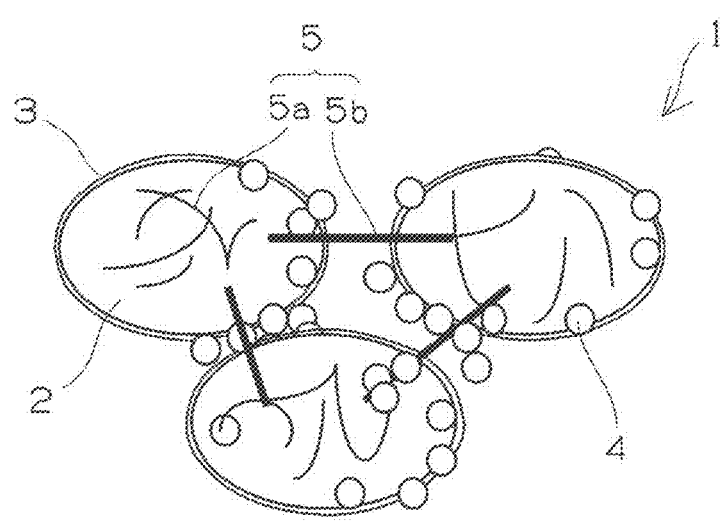
FIG. 1 is a pattern diagram of a positive-electrode material for a lithium-ion secondary battery.
Figure 2:
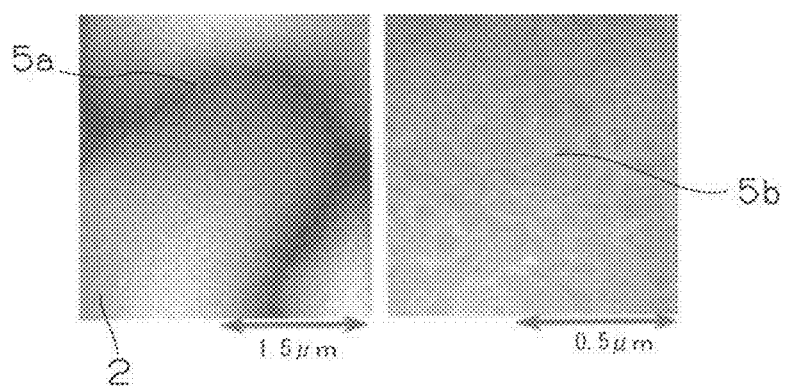
FIG. 2 shows a photograph of the surface of the positive-electrode material taken by a transmission-type electron microscope.

FIG. 1 shows a pattern diagram of the positive-electrode material, for the lithium-ion secondary battery, which is used in the present invention. FIG. 1 shows a state in which the lithium-containing metal phosphate compound coated with a carbon material having a graphene phase and the like on its surface, the carbon black, and the fibrous carbon material different in its fiber diameters or fiber lengths are combined with one another. FIG. 2 shows a photograph of the surface of the positive-electrode material taken by a transmission-type electron microscope.

As shown in FIG. 1, an active substance of a positive-electrode material 1 for the lithium-ion secondary battery is a lithium-containing metal phosphate compound 2 whose surface is coated with a carbon material 3. The thickness of the carbon material 3 coating the surface of the lithium-containing metal phosphate compound 2 is several nanometers. The surface of the carbon material 3 is composed of a graphene phase and the like. The lithium-containing metal phosphate compound 2 is combined with carbon black 4 and a fibrous carbon material 5. It is preferable that the fibrous carbon material 5 is a mixture of a fibrous carbon material 5a having a small fiber diameter and a short fiber length and a fibrous carbon material 5b having a large fiber diameter and a long fiber length. The fibrous carbon material 5a is mainly connected to the surfaces of the lithium-containing metal phosphate compounds 2, whereas the fibrous carbon material 5b mainly connects the lithium-containing metal phosphate compounds 2 to each other.

As shown in FIG. 2, the fibrous carbon material 5a is mainly present on the surfaces of the lithium-containing metal phosphate compounds 2. The fibrous carbon material 5b is present between the lithium-containing metal, phosphate compounds 2.

In the negative-electrode material for the lithium-ion secondary battery, instead of the lithium-containing metal phosphate compounds 2, a graphite carbon material is used.

The active substance is uniformly dispersed in each of the positive-electrode material and the negative-electrode material to be used in the present invention. The uniform dispersion of the active substance is accomplished by pulverizing powder of the positive electrode and powder of negative electrode and uniformly mixing respective particles with one another by utilizing a shearing force to be generated by the compression shear impact-type particle-compositing method, adding the fibrous carbon material dispersed in a water solution to the powders and mixing them with each other to form a mixture, and adding a binder containing the water-soluble or water-dispersible synthetic resin to the electrode material. By adding a dispersant and/or a surface active agent to the binder after or before the water-soluble or water-dispersible synthetic resin is added to the electrode material, the uniform dispersion is improved to a higher extent in the last case.

The carbon black and the lithium-containing metal phosphate compound are pulverized and dispersingly mixed with each other, and the carbon black and the graphite carbon material are pulverized and dispersingly mixed with each other by using the compression shear impact-type particle-compositing method to form a mixture. Thereafter a water solution in which the fibrous carbon material is dispersed is mixed with the mixture. Thereafter the binder consisting of the water-soluble synthetic resin or with the water-dispersible synthetic resin is mixed with a composite formed by calcining the solution in which the positive-electrode material is dispersed and with a composite formed by calcining the solution in which the negative-electrode material is dispersed to form positive-electrode slurry and negative-electrode slurry. Thereafter a positive-electrode plate and a negative-electrode plate are produced. Thereby a battery produced in the above-described manner has improved performance.

As examples of the lithium-containing metal phosphate compound to be used for the positive-electrode material of the present invention, $LiFePO_4$, $LiCoPO_4$, and $LiMnPO_4$ are mentioned. Of these lithium-containing metal phosphate compounds, olivine-type lithium iron phosphate expressed by $LiFePO_4$ is preferable because it is excellent in its electrochemical properties and safety, and low cost.

The surface of the olivine-type lithium iron phosphate is coated with the carbon material. At least one phase selected from among the graphene phase and an amorphous phase is formed on the surface of the olivine-type lithium iron phosphate. These phases are formed by (a) a method of dispersing conductive carbon black such as acetylene black, Ketjen Black or graphite crystal in a solvent to form a slurry application liquid, dispersing particles of the olivine-type lithium iron phosphate in the application liquid, and thereafter drying the solvent; (b) a method of applying an organic substance or a high-molecular compound solution to the surface of the particles of the olivine-type lithium iron phosphate and thermally decomposing the organic substance or the high-molecular compound solution in a reducing atmosphere; (c) an ion deposit method; and (d) a method of forming a thin film on the surface of the particles of the olivine-type lithium iron phosphate by using a chemical vapour deposition (CVD) and/or a physical vapour deposition (PVD).

In the present invention, the graphene phase includes one layer of a plain six-membered ring structure of $sp^2$-connected carbon atoms. The amorphous layer includes a three-dimensional six-membered ring structure. "That electronic conduction is performed owing to compositeness caused by bond between carbon atoms" means that electronic conduction is made owing to the bond between the carbon atoms caused by turbulence of the graphene phase and/or the amorphous phase.

The carbon material coating the surface of the active substance of the positive-electrode material closely contacts the surface of the active substance. The graphene phase and the like are formed on the surface of the carbon material. The thickness of the coating layer of the carbon material is 1 to 10 nm and preferably 2 to 5 nm. When the thickness of the coating layer of the carbon material is less than 1 nm, it is difficult to accomplish electronic conduction to be performed by the bond of the carbon atoms. When the thickness of the coating layer of the carbon material is more than 10 nm, the carbon material layer is thick and the extent of the diffusion of lithium ions to the surface of the active substance which is the reaction portion of the battery becomes low. Therefore the output property of the battery deteriorates.

As the graphite carbon material which can be used as the negative-electrode material, artificial graphite and easy graphitizable powder are exemplified. At least one phase selected from among the graphene phase and the amorphous phase is formed on the surface of the graphite carbon material. The graphene phase and the amorphous phase may be formed directly on the surface of the graphite carbon material, or formed thereon after covering the surface of the graphite carbon material with the carbon material similarly to the method of producing the positive-electrode material.

The carbon black which can be used in the present invention is the conductive carbon black. As the conductive carbon black, acetylene black and Ketjen black are exemplified.

The fibrous carbon material which can be used in the present invention consists of a carbon nanotube and/or a carbon nanofiber. The carbon nanotube means a tube consisting of a single-walled ring. The carbon nanofiber means a tube consisting of a multi-walled ring.

In the present invention, one kind of the fibrous carbon material may be used. Alternatively it is preferable to use at least two kinds of the fibrous carbon materials different in the fiber diameters and fiber lengths thereof. That is, it is possible to use (a) the fibrous carbon materials different in both the fiber diameters and the fiber lengths thereof, (b) the fibrous carbon materials equal in the fiber diameters thereof and different in the fiber lengths thereof, and (c) the fibrous carbon materials different in the fiber diameters thereof and equal in the fiber lengths thereof.

The fibrous carbon materials different in both the fiber diameters and the fiber lengths thereof are preferable.

The diameter of one of the fibrous carbon materials is 5 to 15 nm, whereas the diameter of the other fibrous carbon material is 70 to 150 nm. It is preferable that the diameter of one of the fibrous carbon materials is 10 nm, whereas the diameter of the other fibrous carbon material is 100 nm.

The fiber length of the fibrous carbon material having the diameter of 5 to 15 nm is 1 to 3 μm and preferably 3 μm. The fiber length of the fibrous carbon material having the diameter of 70 to 150 nm is 5 to 10 μm and preferably 5 μm. That is, in the present invention, it is preferable to use the fibrous carbon material having a small fiber diameter and a short fiber length and the fibrous carbon material having a large fiber diameter and a long fiber length in combination.

In the positive-electrode material, for the lithium-ion secondary battery, which can be used in the present invention, the ratio of the total of the content of the carbon black and that of the fibrous carbon material to the total of the amount of the lithium-containing metal phosphate compound coated with the carbon material, that of the carbon black, and that of the fibrous carbon material is not less than 2 mass % and preferably 2 to 10 mass %.

In the negative-electrode material, for the lithium-ion secondary battery, which can be used in the present invention, the ratio of the total of the content of the carbon black and that of the fibrous carbon material to the total of the amount of the graphite carbon material coated with the carbon material, that of the carbon black, and that of the fibrous carbon material is not less than 2 mass % and preferably 2 to 10 mass %.

In the positive-electrode material and the negative-electrode material, it is preferable that the mixing ratio between the carbon black and the fibrous carbon material is: [carbon black/fibrous carbon material=(2 to 8)/(1 to 3), i.e. ⅔ to 8] in a mass ratio.

The binder which can be used in the present invention is formed by dissolving or dispersing the water-soluble synthetic resin or the water-dispersible synthetic resin in water.

The water-soluble synthetic resin dissolves in water partly or completely. The water-dispersible synthetic resin is dissolvable in water.

Examples of preferred water-soluble synthetic resin or the water-dispersible synthetic resin are polyacrylic acid, styrene-butadiene rubber, polyvinyl alcohol, polyvinyl acetate, polyethylene oxide, polyvinyl pyrrolidone, and polyacrylamide.

Of these resins, the polyacrylic acid and the styrene-butadiene rubber are most preferred.

The binder dispersant which can be used in the present invention adjusts the viscosity of the binder and improves the dispersion the positive-electrode material and the negative-electrode material. As the binder dispersant, cellulose derivatives are most preferred. Of the cellulose derivatives, carboxyl methyl cellulose is most preferred.

The surface active agent which can be used in the present invention specifically fixes to the surface of the conductive material and prevents secondary aggregation of the conductive materials and captures the binder, thus preventing the conductive material from aggregating with the positive-electrode material as well as the negative-electrode material.

The surface active agent has a high effect for the fibrous carbon material such as the carbon nanotube. To disperse the carbon nanotube in water, it is necessary to perform treatment of attaching a hydrophilic group to the surface of the carbon nanotube. The hydrophilic group and the surface active agent are combined with each other. Thus selective fixing of the carbon nanotube to the surface of the binder is delayed. It is considered that this phenomenon results in non-generation of the secondary aggregate.

Because it is considered that this effect is different in dependence on the amount of the hydrophilic group of the carbon nanotube, this effect is different according to the amount of the surface active agent. According to an experimental result, the addition of 0.5 to 5 mass % of the surface active agent to the whole amount of the binder was the optimum range. The addition of 1 mass % thereof was most effective. When the addition amount thereof was out of the above-described range, the surface active agent did not have any effect.

Examples of preferred surface active agent are polar solvents such as N-methyl-2-pyrrolidone, dimethylformamide, dimethylacetamide, and dimethyl sulfoxide. Of these polar solvents, the N-methyl-2-pyrrolidone is most preferred.

Other category of surface active agent may be selected for example from fatty acid salts (for example oleic acid or lithium oleate), fatty acid esters, fatty alcohol esters, alkoxylated alcohols, alkoxylated amines, fatty alcohol sulfate or phosphate esters, imidazolium and quaternary ammonium salts, ethylene oxide/propelene oxide. Some derivatives of fatty acid are also of particular interest for example, Tween® surfactants produced by Uniquema, and especially Tween® 80 and 81 (polyoxyethylenesorbitan monooleate), or Tween® 85 (polyoxyethylenesorbitan trioleate). Other type of anionic and nonionic surfactants could be used like; Sulfosuccinates (Triton-GR series), Sulfates and Sulfonates (Triton XN), Ocytylphenol Ethoxylate (Triton-X). In low foam surfactants we can find the Triton-DF, CF series, Alcohol Ethoxylates (Tergitol-TMN and S series), Nonylphenol Ethoxylates (Tergitol NP series), Alkyl Diphenyl Oxide Dislfonates (Dowfax series).

The method of producing the lithium-ion secondary battery of the present invention is described below.

The method of producing the positive-electrode material, for the lithium-ion secondary battery, which can be used in the present invention, has a first mixing step of mixing the lithium-containing metal phosphate compound coated with the carbon material and the carbon black with each other by using the compression shear impact-type particle-compositing method.

In the negative-electrode material, the graphite carbon material coated with the carbon material and the carbon black are also mixed with each other by using the compression shear impact-type particle-compositing method.

In the compression shear impact-type particle-compositing method, powders applied to an inner wall of a rotary container by a centrifugal force are mixed with one another between the rotary container and a press head, having a radius of curvature different from that of the rotary container, which is fixed to the inside of the rotary container, while a strong compression shearing force is being applied to the powders. As mixing apparatus to be operated by using this method, a Mechanofusion mixing machine (produced by Hosokawa Micron Corporation) and a Nobilta mixing machine (produced by Hosokawa Micron Corporation) are known.

A mixture obtained at the first mixing step is mixed with the fibrous carbon material dispersed in water (second mixing step) to form a mixture.

As the fibrous carbon material dispersed in water, a dispersion liquid in which the carbon nanotube and the like are dispersed in water is preferably used. By adding the dispersion liquid to the mixture, the fibrous carbon material uniformly disperses in powders which are mixed by using the compression shear impact-type particle-compositing method.

In each of the positive-electrode material and the negative-electrode material of the present invention for the lithium-ion secondary battery, it is preferable to mix the above-described materials with each other to form a mixture by using the compression shear impact-type particle-compositing method and thereafter mix the fibrous carbon material with the mixture, and thereafter calcine the mixture. By calcining the mixture, the surfaces of the mixed materials are combined with one another owing to the bond between carbon atoms. As a result, electronic conduction between the surfaces of the materials is improved to a higher extent.

It is preferable to calcine the mixture in a condition of 700 to 850° C. under an inert atmosphere for 0.5 to two hours.

The mixture obtained at the second mixing step is mixed with a water solution in which the water-soluble synthetic resin has dissolved or with a solution in which the water-dispersible synthetic resin has dispersed (third mixing step). It is preferable to add the dispersant and/or the surface active agent to the binder at this mixing time.

A slurry is formed by mixing a water solution in which polyacrylic acid or the like has dissolved with the mixture obtained in the second mixing step. In this manner, the positive electrode and the negative electrode are produced.

The separator which can be used for the lithium secondary battery using the positive electrode and the negative electrode of the present invention holds the electrolyte with the separator electrically insulating the positive electrode and the negative electrode from each other. As the separator, a film made of a synthetic resin or fibrous nonwoven cloth is exemplified. As examples of the above-described materials, a polyethylene film, a polypropylene film, cellulose fibers, and glass fibers are listed. It is preferable to use porous fibrous nonwoven cloth because it is capable of favorably maintaining the electrolyte.

As electrolytes of the lithium secondary battery in which the group of electrodes is immersed, it is preferable to use non-aqueous electrolytes containing lithium salts or ion-conducting polymers.

Examples of preferred non-aqueous solvents of the non-aqueous electrolytes containing the lithium salts are ethylene carbonate (hereinafter referred to as EC), propylene carbonate (PC), diethyl carbonate (DEC), dimethyl carbonate (DMC), and methyl ethyl carbonate (hereinafter referred to as MEC).

Examples of preferred lithium salts which can be dissolved in the non-aqueous solvents are lithium hexafluorophosphate ($LiPF_6$), lithium boron tetrafluoride ($LiBF_4$), lithium trifluoromethanesulfonate ($LiSO_3CF_4$), lithium bistrifluoromethanesulfonamide ($LiN(SO_2CF_3)_2$), lithium bis (perfluoroethysulfonyl) imide ($LiN(SO_2C_2F_5)_2$) or their mixtures.

The positive-electrode material and the negative-electrode material for the lithium-ion secondary battery are formed by layering the positive-electrode material on the surface of the positive-electrode material and the negative-electrode material on the surface of the negative-electrode material both serving as an electricity collector. A metal thin film can be exemplified as the electricity collector of the positive-electrode plate. An aluminum foil can be exemplified as the electricity collector of the positive electrode. A copper foil can be exemplified as the electricity collector of the negative electrode.

EXAMPLES

The positive and negative electrodes for the lithium secondary battery of the present invention are described in detail below by way of examples and comparative examples. But the present invention is not limited to the examples described below unless the examples depart from the gist of the present invention. An example of the method of the present invention for producing the positive and negative electrodes and an example of the method of the present invention for producing a laminate type battery are shown below.

<Formation of Positive Electrode>

The olivine-type lithium iron phosphate ($LiFePO_4$) having a secondary particle diameter of 0.5 to 2 μm was used as the active substance of the positive electrode. The olivine-type lithium iron phosphate was coated with the carbon material having a thickness of about 3 nm by using an evaporation method in which carbonized gas was used. The carbon-coated olivine-type lithium iron phosphate (hereinafter referred to as LFP) was used as an active substance of the positive electrode. Acetylene black powder (hereinafter referred to as AB) and a dispersion of carbon nanotube in water (hereinafter referred to as CNT) were used as a conductive material. A water solution of synthesized polyacrylic acid resin (hereinafter referred to as PAA) was used as a water-soluble binder. Before the binder was supplied to the mixture of the LFP, the AB, and the CNT, a water solution of carboxyl methyl cellulose (hereinafter referred to as CMC) and a water solution of N-methyl-2-pyrrolidone (hereinafter referred to as NMP) were added to the mixture of the LFP, the AB and the CNT as a re-aggregation inhibitor and a dispersion solvent, and thereafter the components were kneaded to prepare a positive-electrode mixed agent (slurry). The ratio among solid contents of the materials of the positive electrode was set to: LFP/AB/CNT/PAA/CMC=86/8/2/3/1 mass %. The NMP was added to the entire positive-electrode mixed agent (slurry) at 1 mass % to prepare a slurry. The positive-electrode mixed agent (slurry) was applied in an amount of 140 g/m² to both surfaces of aluminum foil having a thickness of 20 μm and dried. Thereafter the positive-electrode mixed agent (slurry) was pressed and cut to obtain the positive electrode for the lithium secondary battery.

The method of adding the AB and the CNT which contributes to a decrease in the resistance of the olivine-type lithium iron phosphate of the positive electrode to the olivine-type lithium iron phosphate is described below. The kind of the carbon black and that of the fibrous carbon material to be used in the example, the mixing method for performing uniform dispersion, and the compositing method are not limited to those shown below, provided that they do not depart from the gist of the present invention.

As the method of uniformly and dispersedly mixing the AB and the LFP with each other, a mechanochemical method, for example, the Mechanofusion mixing machine (produced by Hosokawa Micron Corporation) was used as the compression shear impact-type particle-compositing method. The CNT is added in dispersion of carbon nanotube in water (polar plate numbers 1, 2 shown in table 1). As the method of preparing the composite of the conductive materials of the present invention and the LFP, a high-temperature calcining method was used in a reducing atmosphere in which the temperature was set to 700 to 800° C. (polar plate number 3 shown in table 1).

As a conventional positive-electrode plate, in the case of the water-soluble or water-dispersible binder, after the conductive material and lithium iron phosphate were mixed as solid powder at a time with each other, the water-soluble or water-dispersible binder and the water solution of the CMC were dispersed to form a slurry. Thereafter a positive-electrode plate was prepared in conformity to the above-described method of forming the positive-electrode plate (polar plate number 4 shown in table 1).

A positive-electrode plate using a binder soluble in a solvent consisting of vinylidene polyfluoride (hereinafter referred to as PVDF) was formed as follows:

The ratio among solid contents of the positive electrode was set to: LFP/AB/CNT/PVDF=84/8/2/6 mass %. Except the binder, all of the materials were mixed in the form of powder. By using the prepared solvent-soluble slurry for the positive electrode, a positive-electrode plate was prepared in conformity with the method of forming the positive electrode composed of the water-soluble or water-dispersible slurry (polar plate number 5 shown in table 1).

<Preparation of Negative Electrode>

Similarly to the case of the positive-electrode plate, powder of the carbon-coated artificial graphite (hereinafter referred to as C-G) and powder of the AB were pulverized and uniformly and dispersedly mixed with each other by using the Mechanofusion mixing machine. Thereafter the CNT dispersed in water was added to the mixture of the C-G and the AB to form a slurry. Thereafter similarly to the case of the positive-electrode plate, a water solution of a water-soluble binder, a water solution of the CMC, and a water solution of the NMP were added to the slurry. As the water-soluble binder, styrene-butadiene rubber (hereinafter referred to as SBR) was used in the case of the negative electrode. The ratio among solid contents of the materials of the negative electrode was set to: C-G/AB/CNT/SBR/CMC=93/4/1/1/1 mass %. The prepared slurry was applied in an amount of 80 g/m² to both surfaces of a copper foil having a thickness of 10 μm and dried. Thereafter the slurry was pressed and cut to obtain the negative electrode.

In the above-described electrode, after powders of the combined materials of the negative electrode were mixed with one another by using the Mechanofusion mixing machine, a water solution in which carbon nanotube was dispersed was supplied to the composite powder. Thereafter the mixture was calcined at 1,100° C. to combine them with each other. Thereafter using the powders combined with one another, the negative-electrode plate consisting of the combined powders was obtained by using the above-described method (polar plate numbers 6, 7, and 8 shown in table 1).

As negative-electrode plates of the comparative examples, after all of the materials composing the negative electrode were simultaneously mixed with one another as solid powders, a solution of the water-soluble binder and a water solution of the CMC were supplied to the mixture of the combined solid powders to form a slurry. Thereafter the slurry was applied to the copper foil and dried to prepare the negative-electrode plates (polar plate number 9 shown in table 1).

In the case of a negative-electrode plate using a solvent-soluble binder, similarly to the above-described method, after powders of all of materials composing the negative electrode were simultaneously mixed one another to form a mixture, a binder soluble in the PVDF was added to the mixture to form a slurry. The ratio among solid contents of the materials was set to: C-G/AB/CNT/PVDF=90/4/1/5 mass %. A negative-electrode plate was prepared similarly to the above-described method (polar plate number 10 shown in table 1).

TABLE 1

| Electrode plate | | Electrode plate material and electrical conductive material | | Binder | | |
|---|---|---|---|---|---|---|
| Number | Kind | Mixing method | Compositing | Kind | Dispersion agent | Surface-active agent |
| 1 | Positive-electrode plate | Compression shear impact-type particle-compositing + mixing of water | Not-done | Aqueous solution of polyacrylic | Used | Used |
| 2 | | | Not-done | | Used | Not-used |
| 3 | | | Done | | Used | Used |
| 4 | | Powder mixing | Not-done | | Used | Not-used |
| 5 | | | | Solution of PVDF | Not-used | Not-used |
| 6 | Negative electrode plate | Compression shear impact-type particle-compositing + mixing of water | Not-done | Aqueous solution of styrene butadiene rubber | Used | Used |
| 7 | | | Not-done | | Used | Not-used |
| 8 | | | Done | | Used | Used |
| 9 | | Powder Mixing | Not-done | | Used | Not-used |
| 10 | | | | Solution of PVDF | Not-used | Not-used |

As shown in table 1, by using five kinds of the positive electrodes and five kinds of the negative electrodes, positive-electrode plates and negative-electrode plates were formed. The positive-electrode plates and negative-electrode plates were combined with each other to prepare batteries of examples 1 through 3 and comparative examples 1 and 2. The batteries were of a laminate type having 500 mAh. As a separator for electrically partitioning the positive-electrode plate and the negative-electrode plate from each other, nonwoven cloth made of cellulose fibers was used. An electrolyte used contained 1 mol/l of lithium hexafluorophosphate ($LiPF_6$) and 1 mass % of vinylene carbonate both of which were added to and dissolved in a solution in which the EC and the MEC were mixed with each other at a volume ratio of 30:70.

As a discharge performance test of the batteries, after each battery was initially charged, it was confirmed that the charge and discharge efficiency reached the neighborhood of 100%. Thereafter a discharged capacity of the battery was measured when the battery was discharged up to 2.0V at a constant electric current of 100 mA. Thereafter the discharge performance thereof was examined when electric current of 5000 mA is flowed there through. The discharge performance thereof is shown in table 2 as a discharge capacity maintenance ratio (%) which is the ratio of the discharge capacity at the electric current of 5000 mA to the discharge capacity at the electric current of 100 mA. Thereafter as a cycle performance test, the battery was charged at a constant electric current and a constant voltage (finished at 25 mA) of 4.0V (limited current of 1500 mA), and the battery was discharged up to 2.0V at a constant electric current of 1500 mA. The test was suspended 1000 times for 10 minutes in each of the charge and discharge. The ratio of the capacity of the battery at the 1000th cycle to the discharge capacity at the first cycle is shown in table 2 as the capacity maintenance ratio (%) at the 1000th cycle.

TABLE 2

| | Combination of electrode plates | | Properties of batteries | |
|---|---|---|---|---|
| | Number of positive-electrode | Number of negative-electrode | Discharge capacity maintenance ratio (%) | Capacity maintenance ratio at the 1000th (%) |
| Example 1 | 1 | 6 | 95 | 92 |
| Example 2 | 3 | 8 | 99 | 99 |
| Example 3 | 2 | 7 | 90 | 75 |
| Comparative example 1 | 4 | 9 | 56 | 61 |
| Comparative example 2 | 5 | 10 | 55 | 43 |

The results of table 2 indicate that the batteries of the examples 1 through 3 of the present invention had a higher capacity and a longer life than the batteries of the comparative examples 1 and 2. The batteries in which the binder containing the water-soluble or water-dispersible synthetic resin was used had an improved property over the batteries in which the solvent-soluble synthetic resin was used. The reason the discharge capacity maintenance ratio was improved is because the addition amount of the water-soluble or water-dispersible binder is smaller than that of the solvent-soluble binder and a battery reaction substance substantially increases. The improvement in the capacity maintenance ratio (%) at the 1000th cycle is because in the case of the solvent-soluble binder, oxidation progresses during the cycle life test and a binding force deteriorates, whereas in the case of the water-soluble or water-dispersible binder, an oxidation reaction does not progress.

Because the composing materials and the binders used for the positive and negative electrodes of the batteries of the examples 1 through 3 and the battery of the comparative example 1 are the same as those of the water-soluble or water-dispersible type, the reason the performance of the batteries of the examples 1 through 3 and that of the battery of the comparative example 1 are extremely different is not attributed to the difference in the performances of the composing materials. In forming the positive and negative electrodes, the slurry disperses more uniformly, and the conductive material and the main material of each of the positive and negative electrodes disperse more favorably inside the positive and negative electrodes in the examples 1 through 3 than in the comparative example 1. Therefore in the examples 1 through 3, a secondary aggregate is not present and thus the electronic conduction network is uniformly constructed inside the positive and negative electrodes.

Figure 3:
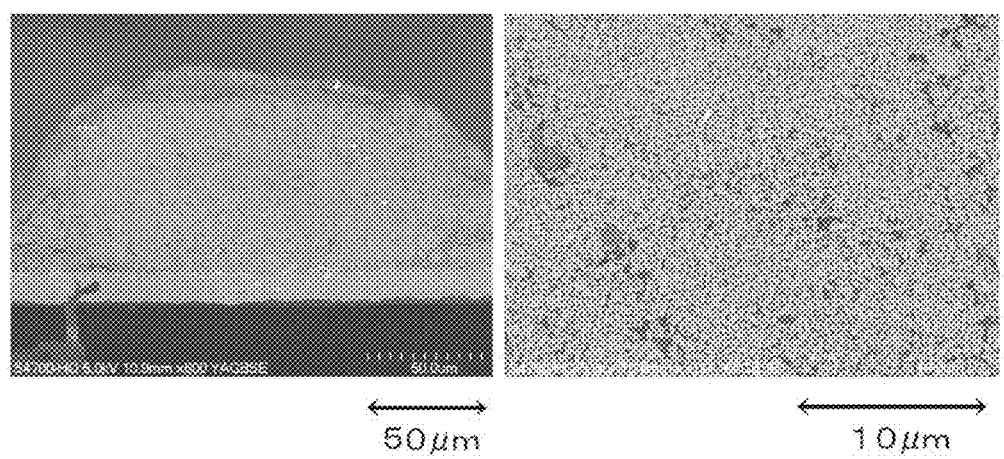
FIG. 3 shows a photograph showing a section of a positive-electrode plate of an example 1.
Figure 4:
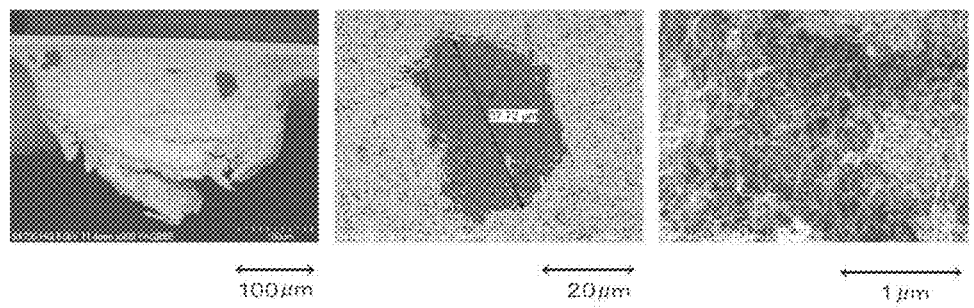
FIG. 4 shows a photograph showing a section of a positive-electrode plate of a comparative example 1.

To prove it, the section of the positive-electrode plate of each of the example 1 and the comparative example 1 was examined. FIGS. 3 and 4 show the photograph thereof. FIG. 3 shows the section of the positive-electrode plate of the example 1. The right-hand side of FIG. 3 is an enlarged view of the left-hand side of FIG. 3. FIG. 4 shows the section of the positive-electrode plate of the comparative example 1. The magnification becomes larger toward the right-hand side of FIG. 4.

As shown in FIG. 3, in the electrode production method of the example 1, the conductive material and the lithium iron phosphate disperse uniformly without the occurrence of secondary aggregation.

As shown in FIG. 4, it has been found that in the comparative example 1, the secondary aggregation occurred and thus uniform dispersion was difficult.

The addition amount of the water-soluble or water-dispersible binder is smaller than that of the binder soluble in the solvent consisting of vinylidene polyfluoride, and the cost of the former is lower than that of the latter. Therefore to obtain the same performance effect, it can be said that the use of the former greatly decreases the cost in producing the battery.

The positive and negative electrode for the lithium secondary battery of the present invention allow the lithium secondary battery to have a high capacity when it is charged and discharged at a high electric current and charged and discharged for a very long time and stably repeated at the high electric current. Therefore the positive and negative electrodes can be preferably utilized for uses such as electric vehicles and hybrid cars demanded to be produced at a low cost, durable, charged and discharged at the high current, travel a long distance, and consume a minimal amounts of fuel.

The invention claimed is:

1. A lithium-ion secondary battery comprising positive and negative electrodes, a separator element, an electrical conductor element and a binder, wherein:

the positive electrode comprises a lithium-containing metal phosphate compound coated with a carbon material having at least one phase selected from a graphene phase and an amorphous phase, and further comprises conductive carbon black and a fibrous carbon mixed material, wherein the positive electrode is prepared by a process comprising uniformly and dispersedly mixing the carbon black and lithium-containing metal phosphate compound particulates prior to blending with a dispersion of the fibrous carbon mixed material, wherein the fibrous carbon mixed material is a mixture of a first fibrous carbon material having a fiber diameter of about 5 to 15 nm and a fiber length of about 1 to 3 μm and a second fibrous carbon material having a fiber diameter of about 70 to 150 nm and a fiber length of about 5 to 10 μm, and wherein the first fibrous carbon material is mainly present on the surface of the lithium-containing metal phosphate particulates, and the second fibrous carbon material is mainly present between the lithium-containing metal phosphate compound particulates;

the negative-electrode material comprises a graphite material present as particulates having at least one carbon phase selected from a graphene phase and an amorphous phase, and further comprises carbon black and a fibrous carbon mixed material, wherein the negative electrode is prepared by a process comprising uniformly and dispersedly mixing the carbon black and graphite carbon material prior to blending with a dispersion of the fibrous carbon mixed material, wherein the fibrous carbon mixed material is a mixture of a first fibrous carbon material having a fiber diameter of about 5 to 15 nm and a fiber length of about 1 to 3 μm and a second fibrous carbon material having a fiber diameter of about 70 to 150 nm and a fiber length of about 5 to 10 μm, and wherein the first fibrous carbon material is mainly present on the surface of the particulates of graphite material, and the second fibrous material is mainly present between the particulates of graphite material; and the binder comprises a water-soluble synthetic resin or a water-dispersible synthetic resin.

2. A lithium-ion secondary battery according to claim 1, wherein the lithium-containing metal phosphate compound is $LiFePO_4$, $LiCoPO_4$, or $LiMnPO_4$.

3. A lithium-ion secondary battery according to claim 1, wherein the lithium-containing metal phosphate compound is $LiFePO_4$.

4. A lithium-ion secondary battery according to claim 1, wherein the graphite is artificial graphite or graphitazable powder.

5. A lithium-ion secondary battery according to claim 1, wherein the carbon black is a conductive carbon black selected from acetylene black and Ketjen black.

6. A lithium-ion secondary battery according to claim 1, wherein the fibrous carbon material is a carbon nanotube, a carbon nanofiber or a mixture thereof.

7. A lithium-ion secondary battery according to claim 1, wherein the water-soluble synthetic resin or a water-dispersible synthetic resin is polyacrylic acid, styrene-butadiene rubber, polyvinyl alcohol, polyvinyl acetate, polyethylene oxide, polyvinyl pyrrolidone, or polyacrylamide.

8. A lithium-ion secondary battery according to claim 1, wherein the binder further comprises a binder dispersant.

9. A lithium-ion secondary battery according to claim 8, wherein the binder dispersant is carboxyl methyl cellulose.

10. A lithium-ion secondary battery according to claim 1, wherein the binder further comprises a surface active agent.

11. A lithium-ion secondary battery according to claim 10, wherein the surface active agent is N-methyl-2-pyrrolidone, dimethylformamide, dimethylacetamide, or dimethyl sulfoxide.

12. A lithium-ion secondary battery according to claim 10, wherein the surface active agent is a fatty acid, a fatty acid ester, a fatty alcohol ester, an alkoxylated alcohol, an alkoxylated amine, a fatty alcohol sulfate, a phosphate ester, an imidazolium or quaternary ammonium salt, ethylene oxide/propylene oxide, polyoxyethylenesorbitan monooleate, an anionic or nonionic surfactant, a sulfate and a sulfonate and ocytylphenol ethoxylate, a low foam surfactant, alcohol ethoxylates, nonylphenol ethoxylates and an alkyl diphenyl oxide disulfonate.

13. A lithium-ion secondary battery according to claim 10, wherein the surface active agent is N-methyl-2-pyrrolidone.

14. A lithium-ion secondary battery according to claim 10, wherein an amount of the surface active agent is about 0.5 to 5 mass % of an amount of the binder.

15. A lithium-ion secondary battery according to claim 1, wherein a thickness of the coating layer is about 1 to 10 nm.

16. A lithium-ion secondary battery according to claim 1, wherein in the positive electrode, the ratio of a total content of the carbon black and the fibrous carbon material to a total content of the coated lithium-containing metal phosphate compound is not less than about 2 mass %.

17. A lithium-ion secondary battery according to claim 1, wherein in the negative electrode, the ratio of a total content of the carbon black and the fibrous carbon material to a total content of the coated graphite carbon material is not less than about 2 mass %.

18. A lithium-ion secondary battery according to claim 1, wherein electronic conduction occurs between a surface the graphene phase or the amorphous phase, a surface of the carbon black and a surface of the fibrous carbon material, due to compositeness resulting from bonds between carbon atoms.

19. A method of producing a lithium-ion secondary battery as defined in claim 1, comprising:
(a) mixing, by using a compression shear impact-type particle-compositing method, respectively, the coated lithium-containing metal phosphate compound with the carbon black, and the coated graphite carbon material with the carbon black;
(b) mixing a mixture obtained in step (a) with the fibrous carbon material dispersed in water; and
(c) mixing a mixture obtained in step (b) with a water solution in which the water-soluble resin is dissolved or with a water solution in which the water-dispersible resin is dispersed.

20. A method according to claim 19, further comprising calcining under inert atmosphere a mixture obtained in step (b).

21. A method according to claim 20, wherein calcination is performed at a temperature of about 700 to 850° C., for a period of about 0.5 to 2 hours.

22. A method according to claim 19, wherein in step (c), a binder dispersant is added to the water-soluble resin or the water-dispersible resin prior to mixing with a mixture obtained in step (b).

23. A method according to claim 19, wherein in step (c), a surface active agent is added to the water-soluble resin or the water-dispersible resin prior to mixing with a mixture obtained in step (b).

24. A method according to claim 22, wherein the binder dispersant is carboxyl methyl cellulose.

25. A method according to claim 23, wherein the surface active agent is added at a ratio of about 0.5 to 5 mass % of the amount of the water-soluble resin or the water-dispersible resin.

26. A method according to claim 23, wherein the surface active agent is N-methyl-2-pyrrolidone.

27. A method according to claim 21 wherein in step (c) a binder dispersant and a surface active agent are added to the water-soluble resin or the water-dispersible resin prior to mixing with a mixture obtained in step (b).

* * * * *